United States Patent [19]

Tomse

[11] Patent Number: 4,691,934
[45] Date of Patent: Sep. 8, 1987

[54] TOWING SYSTEM FOR VEHICLES

[76] Inventor: Jack Tomse, 119 Third St., LaSalle, Ill. 61301

[21] Appl. No.: 860,748

[22] Filed: May 7, 1986

[51] Int. Cl.<sup>4</sup> .............................................. B60D 1/00
[52] U.S. Cl. .................................. 280/503; 301/128; 403/1
[58] Field of Search ............... 280/503, 498, 495, 481; 301/128; 403/1

[56] References Cited

U.S. PATENT DOCUMENTS

| | | | |
|---|---|---|---|
| 3,552,813 | 1/1971 | Brescia, Jr. et al. | 301/128 |
| 3,583,728 | 6/1971 | Cornell | 280/503 |
| 4,089,610 | 5/1978 | Kleespies et al. | 301/128 |
| 4,337,003 | 6/1982 | Juhl | 301/128 |

Primary Examiner—John A. Pekar
Assistant Examiner—Donn McGiehan
Attorney, Agent, or Firm—Niro, Scavone, Haller & Niro, Ltd.

[57] ABSTRACT

A system for towing of vehicles having automatic or manual transmissions without causing damage to any part of the drive train and for providing enhanced steerability to a towed vehicle. The vehicle towing system includes a tow bearing device for isolating rotation of a wheel and attached tire from a wheel hub coupled to the automatic transmission and the drive train, thereby enabling the vehicle to be towed efficiently and safely on all wheels without damage to the automatic transmission or drive train, while still making use of the suspension/steering system of the vehicle being towed. The vehicle towing system also includes a steer bar device attachable with or without the tow bearing device to the wheel and attached tire, or to the wheel hub, to provide enhanced, affirmative steering to the towed vehicle, responsive to forces generated by a towing vehicle.

10 Claims, 8 Drawing Figures

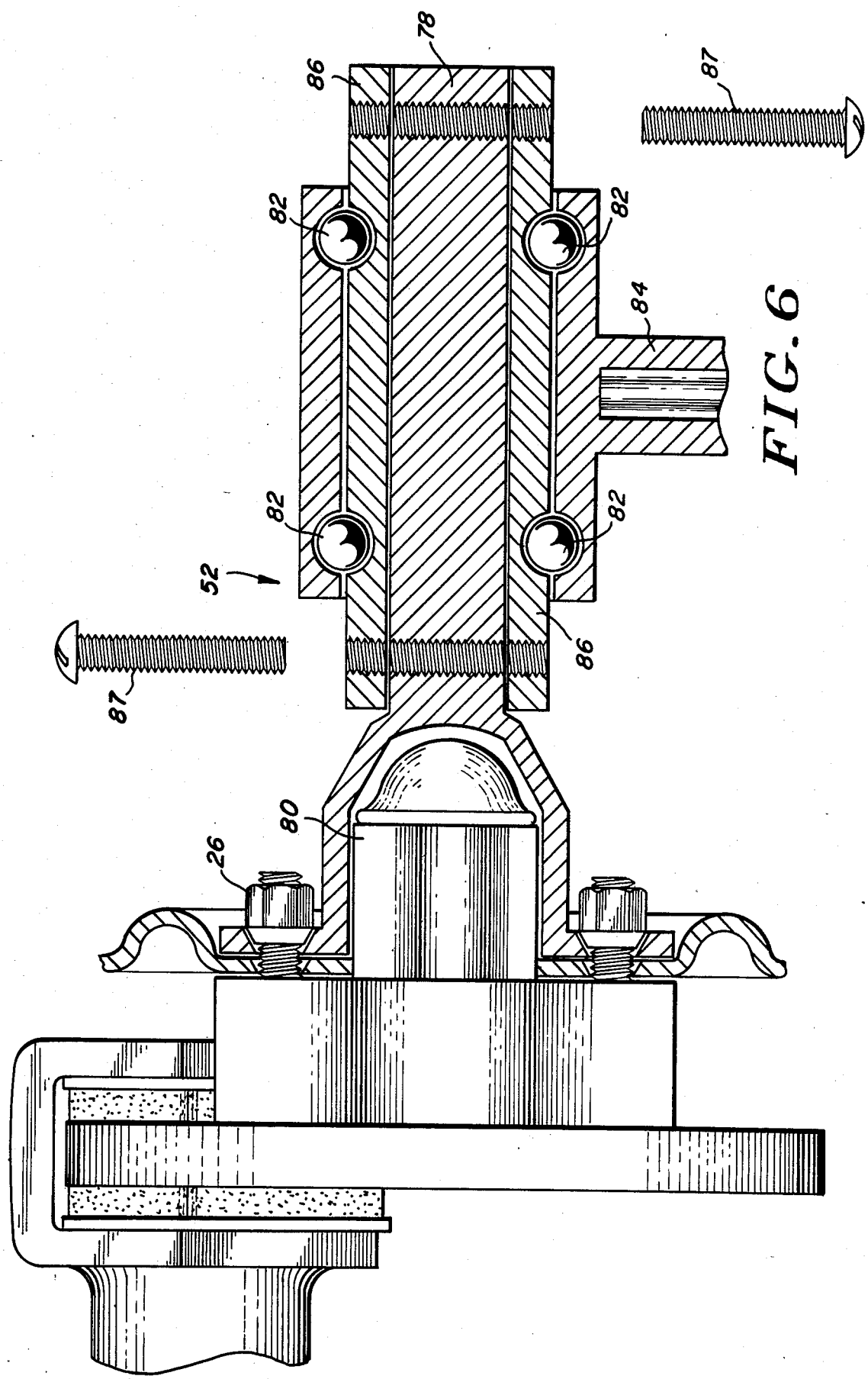

TOWING SYSTEM FOR VEHICLES

BACKGROUND OF THE INVENTION

The present invention is related generally to a system for towing a vehicle and in particular is related to a device attachable to a vehicle for towing the vehicle without requiring rotation of selected vehicle wheel hubs coupled to the device. The system therefore enables the rotation of a wheel and attached tire of a vehicle to be isolated from a vehicle's drive train and/or an automatic transmission connected to a wheel hub of the vehicle and further enables towing of the vehicle with substantially direct response steerability by the towed vehicle. The invention accomplishes the automatic transmission isolation and direct response steerability by utilizing the vehicle's own suspension and steering systems.

Previous apparatus for towing a vehicle has involved connection of a towing vehicle by a tow bar to various portions of the frame or a bumper of the towed vehicle. Towing of vehicles with standard mechanical transmissions generally involves no special difficulty. However, the towing of vehicles with automatic transmissions over anything more than a short distance presents substantial problems since damage can result to the automatic transmission unless the vehicle drive shaft is disconnected or the vehicle is towed on wheels and attached tires not connected to the automatic transmission. Furthermore, current towing systems, such as tow dollys, are quite expensive and create safety hazards by towing the vehicle in an elevated position on only two wheels. There is also a substantial decrease in gas mileage efficiency when towing a vehicle elevated by a tow dolly since there is more wind resistance than towing the vehicle on all its wheels with attached tires. In addition, the tow dolly weighs approximately five hundred pounds, which is substantial additional weight to be carried by the towing vehicle.

There is an increasing percentage of vehicles (currently approximately 85%) equipped with automatic transmissions, particularly front wheel drive vehicles. Consequently, a large and increasing percentage of the population must use inefficient, unsafe and expensive apparatus to perform towing operations on those vehicles equipped with automatic transmissions. As mentioned above, if the vehicle has rear wheel drive with an automatic transmission, the automatic transmission must be disconnected to tow the vehicle on the rear wheels or must be towed backwards on its front wheels using a tow dolly to elevate the rear wheels during transport. If the vehicle has front wheel drive with an automatic transmission, the transmission must be disconnected to tow the vehicle on the front wheels, or the tow dolly must be used to elevate the front end of the vehicle during the towing operation. According to a United States Department of Commerce, Bureau of Census Report entitled, "Geographic Mobility," approximately thirty-seven million Americans move each year. Of this number, 7.4 million move to different counties within the same state and 6.1 million move interstate. This is estimated to translate into approvimately twenty-five million vehicles being relocated, and of that number at least five to seven million vehicles are towed. Many vehicles are however not towed due to the unsafe nature of transport, the inefficiency, the inconvenience of preparing the car for towing and the expense. In view of these disadvantages, the owner of the vehicle often selects the laborious, time consuming choice of driving the vehicle to the new location. Although the mobile American represents the highest percentage of towed vehicles, other applications include: (a) used car dealers transporting used cars to and from auto auctions; (b) car rental agencies returning a car dropped off at various locations could send one driver to retrieve two vehicles, and the steerbar would enable the towing of two or more vehicles; (c) the towing of vehicles behind motor homes; (d) auto salvage operations wishing to tow inoperable vehicles from a distant location to the salvage yard without damaging the transmission; (e) families who spend their summers in the north and their winters in the south could use the inventions to tow their cars; and (f) towing of a third vehicle behind a second towed vehicle.

Additional problems of towing newer types of vehicles include the difficulty of making a proper connection to the vehicle. Generally, standard tow bars are connected to, or near, one of the bumpers of the vehicle. However, in newer vehicles, for the sake of appearance and/or smoother aerodynamic shape, the bumpers are being designed flush with the sheet metal in the area of the bumpers, making connection of a tow bar more difficult. Furthermore, in order to reduce the vehicle weight to meet government gas mileage mandates, the metal thickness is being reduced in constructing the bumper and associated vehicle parts which causes the general strength of the connection to be reduced.

BRIEF SUMMARY OF THE INVENTION

It is therefore an object of the invention to provide an improved system for towing a vehicle.

It is a further object of the invention to provide a novel device for towing a vehicle without requiring rotation of the vehicle wheel hubs attached to the device.

It is another object of the invention to provide an improved vehicle towing system readily attachable to the vehicle without special tools and enabling a safe and efficient towing of the vehicle.

It is an additional object of the invention to provide a novel tow bearing device for vehicles with automatic transmissions with the device disposed between a vehicle wheel with an attached tire and a vehicle wheel hub, which enables isolation of the rotation of the wheel/tire from the wheel hub and the coupled automatic transmission.

If is a further object of the invention to provide an improved steer bar device which is readily attachable to selected wheel hubs of a vehicle for towing the vehicle while providing steering action to a wheel and attached tire coupled to the wheel hub.

It is another object of the invention to provide a novel combination system for towing a vehicle which is coupled to selected wheel hubs of the vehicle, isolating the rotation of vehicle wheels and attached tires from an automatic transmission connected to the wheel hubs and also providing steering action to selected wheels and attached tires.

It is a further object of the invention to provide an improved system for towing a vehicle in which the vehicle's own suspension and steering system is fully utilized.

A feature of the towing system in accordance with the invention lies in attachment of the system to a vehicle wheel hub, enabling isolation from rotation of a coupled wheel and attached tire. A means for isolating rotation of the wheel and attached tire from the wheel hub is a tow bearing device interposed between the wheel with the attached tire and the wheel hub. The tow bearing device is constructed for easy connection to the wheel hub by use of threaded studs on the wheel hubs. The wheel and attached tire is coupled to the interposed tow bearing device by using a set of threaded studs on the outside face of the tow bearing device. Consequently, a vehicle is readily prepared for towing by removing the wheel and attached tire (as if changing a tire), the tow bearing device is then attached to the wheel hub using the original equipment studs on the hub and finally the wheel and attached tire are connected to the outside face set of the tow bearing device studs.

Another aspect of the invention is a steer bar which acts both as a towing bar and also provides steering action to wheel hubs of the vehicle. When the towing vehicle makes a turn, forces are applied to the steer bar causing an affirmative application of forces to the wheel hubs, and in turn the steering system of the vehicle, responsive to turning of the towing vehicle. The direct mechanical bumper to bumper standard tow bar type of attachment is made unnecessary by the ability to connect the towed vehicle and the towing vehicle through the suspension system of the towed vehicle. Because of this direct mechanical connection, a major portion of the up and down motion of either vehicle is transmitted to the other. With the steerbar being connected through the suspension system, however, the transmission of such forces is dampened through the suspension system and pneumatic tires. This improves steerability of both vehicles, avoids creation of unsafe conditions and substantially improves the comfort of the ride in the towing vehicle.

A tow bearing device can also be connected between the steer bar and the rotating wheel hub. Consequently, safe efficient towing of a front wheel drive vehicle with an automatic transmission is therefore accomplishable with the combination of the steer bar providing affirmative steering action and the tow bearing device providing isolation of wheel and tire rotation from the wheel hub and the coupled automatic transmission.

Further objects and advantages of the present invention, together with the organization and manner of operation thereof, will become apparent from the following detailed description of the invention when taken in conjunction with the accompanying drawings where unlike reference numerals designate like elements throughout the several views.

BRIEF DESCRIPTION OF THE DRAWINGS

FIG. 6 is a steer bar device coupled directly to a wheel hub shown in FIG. 1A.

DESCRIPTION OF PREFERRED EMBODIMENTS

Figure 1B:
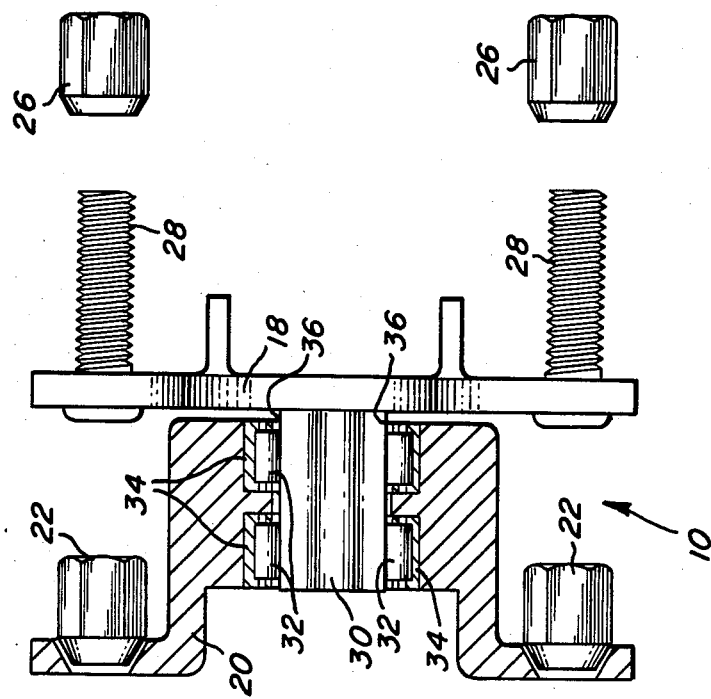
FIG. 1A is a wheel hub and wheel bearing of a vehicle and FIG. 1B is a tow bearing device for attachment to the wheel hub of FIG. 1A.
Figure 1A:
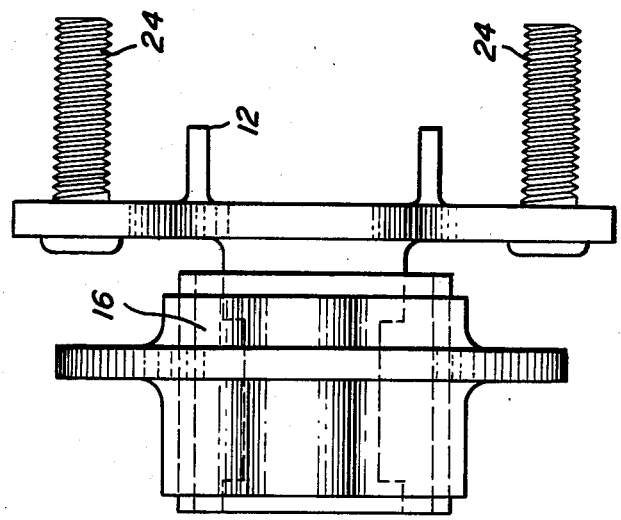

Referring now to the drawings, and in particular to FIG. 1 there is illustrated one embodiment of a tow bearing device generally indicated at 10. The tow bearing device 10 is attachable to a vehicle 11 (see FIG. 5) for towing of the vehicle 11 without requiring rotation of a vehicle wheel hub 12 coupled to the tow bearing device 10. In FIG. 1A is shown the wheel hub 12 and a wheel bearing 16 for a typical vehicle. In order to accomplish the rotational isolation of a wheel and the attached tire 17 (see FIG. 5) from the wheel hub 12, means for isolating the rotation is interposed therebetween. The means for isolating generally includes, for example, the bearing device 10 which includes, for example, a ball bearing, roller bearing, cone bearing, a surface bearing and a plain bearing unit disposed between the wheel hub 12 and the wheel and attached tire 17 (hereinafter "wheel/tire 17"). The bearing device 10 enables the wheel hub 12 to remain stationary with the transmission selection lever in park and the emergency brake released while the wheel/tire 17 rotates freely as the vehicle 11 rolls. Therefore, the isolating means is interposed between the wheel hub 12 and the wheel/tire 17 and comprises means for rotatably mounting the vehicle wheel/tire 17, such as an outer hub flange 18 shown in FIG. 1B, and inner means coupled to the wheel hub 12 for isolating the wheel hub 12 from the rotation of the outer hub flange 18 as the coupled wheel/tire 17 turns. The inner isolating means is, for example, an inner bearing assembly 20 attachable by original equipment lug nuts 22 to wheel hub studs 24 of FIG. 1A. The selected vehicle wheel/tire 17 attached thereto is coupled to the outer hub flange 18 by associated lug nuts 26 and by lug nut studs 28. The arrangement of the lug nut studs 28, including spacing and radius from the center of the wheel hub 12, is typically the same as the original vehicle equipment. The outer hub flange 18 rotates on a shaft 30 disposed in rotating contact with roller bearings 32 riding on outer bearing face surface 34 of the inner bearing assembly 20. The outer surface of the shaft 30 forms an inner face surface 36 for the roller bearings 32. Generally, the bearing surfaces 34 and 36 can define large diameter circles lying outside the circle formed by the lug nut studs 28, and/or can define small diameter circles lying inside the circle defined by the lug nut studs 28.

The tow bearing device 10 enables the effective isolation of the rotation of the wheel/tire 17 from the vehicle automatic transmission system (not shown). Consequently, a person can use the tow bearing device 10 for towing vehicles having automatic transmissions by a three step procedure: (a) removing the selected vehicle wheel/tire 17, (b) installing the tow bearing device 10 and (c) re-attaching the vehicle wheel/tire 17 to the outer hub flange 18. When using the tow bearing device 10, the vehicle wheel/tire 17 is selectively displaced to the outside of the vehicle 11 as little as about 1 inch to 1¾ inches beyond the normal position; therefore, the strength, stability and integrity of the vehicle steering and suspension system are not affected. In order to carry out the installation and use of the tow bearing device 10, there are also no modifications required of the original geometry or construction of the vehicle 11. In fact, the inventions are attachable directly through the vehicle suspension system thereby utilizing the vehicle's own suspension and steering system.

Figure 2:
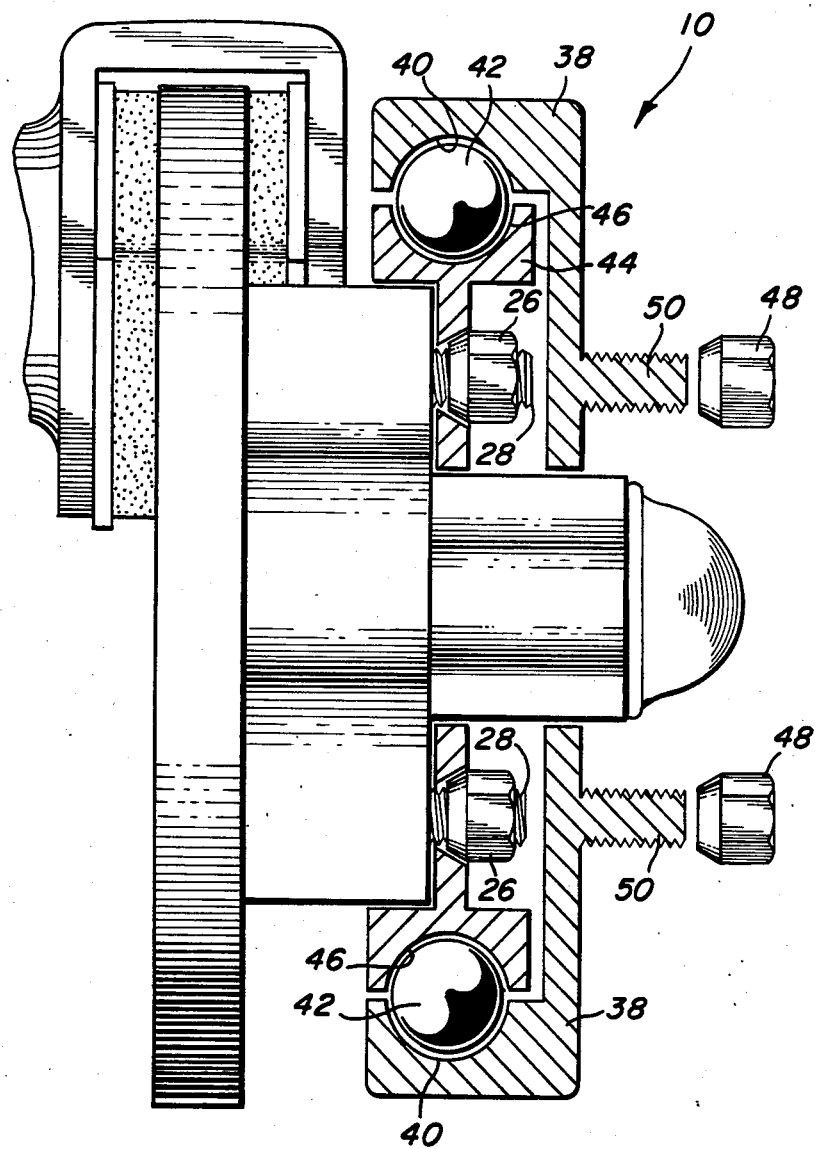
FIG. 2 is a wheel hub and tow bearing device.
Figure 3:
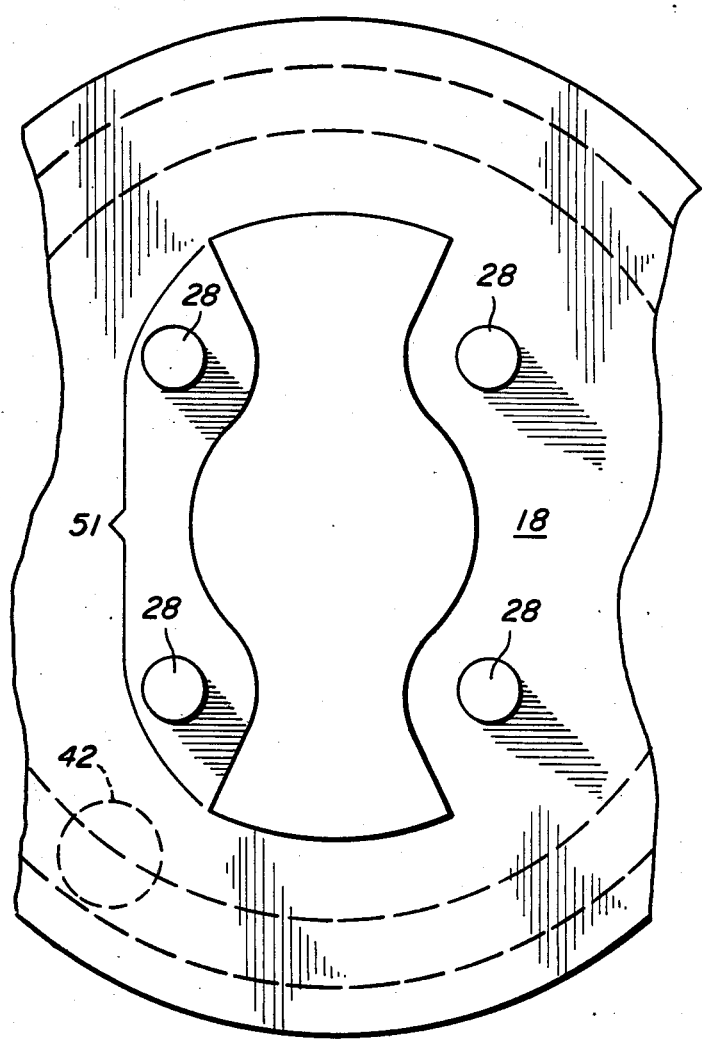
FIG. 3 shows a cutaway view of an access for connecting lug nuts to the inner studs of a tow bearing device.

In another embodiment of the invention shown in FIG. 2, the tow bearing device 10 includes a bearing assembly, such as an outer bearing assembly 38 with outer race surface 40 for ball bearings 42 and an inner bearing assembly 44 with an inner race surface 46 for the ball bearings 42. The inner bearing assembly 44 is coupled to the wheel hub 12 by attaching the lug nuts 26 to the lug nut studs 28. The vehicle wheel/tire 17 (see FIG. 5) is coupled to the outer bearing assembly 38 by lug nuts 48 attached to studs 50. This embodiment functions in substantially the same manner as the one illustrated in FIG. 1, having the attendant advantages thereof. In both the embodiment of FIGS. 1 and 2, access to tighten the lug nuts 26 and 48 on the associated lug nut studs 28 and studs 50, respectively, is accomplished by having an access means, such as access area 51 indicated in FIG. 3, which enables engaging a tool to tighten the lug nuts 26 and 48 of FIGS. 1 and 2, respectively.

The above described tow bearing device 10 is usable with any type of tow bar which can benefit from the safe, efficient isolation of rotation of the selected wheel/tire 17 from the vehicle automatic transmission. Furthermore, significant advantages result upon combining the tow bearing device 10 with a steer bar device shown generally at 52 in FIG. 4. The inner portion 44 of the tow bearing device 10 originally shown in FIG. 2, has been extended to include the coupled steer bar device 52. Included with the steer bar device 52 shown in FIG. 4 is a fixed steering arm 54 and a side bar 56 coupled thereto, such as by a housing 58 bolted thereon by a bolt 60 and nut 61.

Figure 5A:
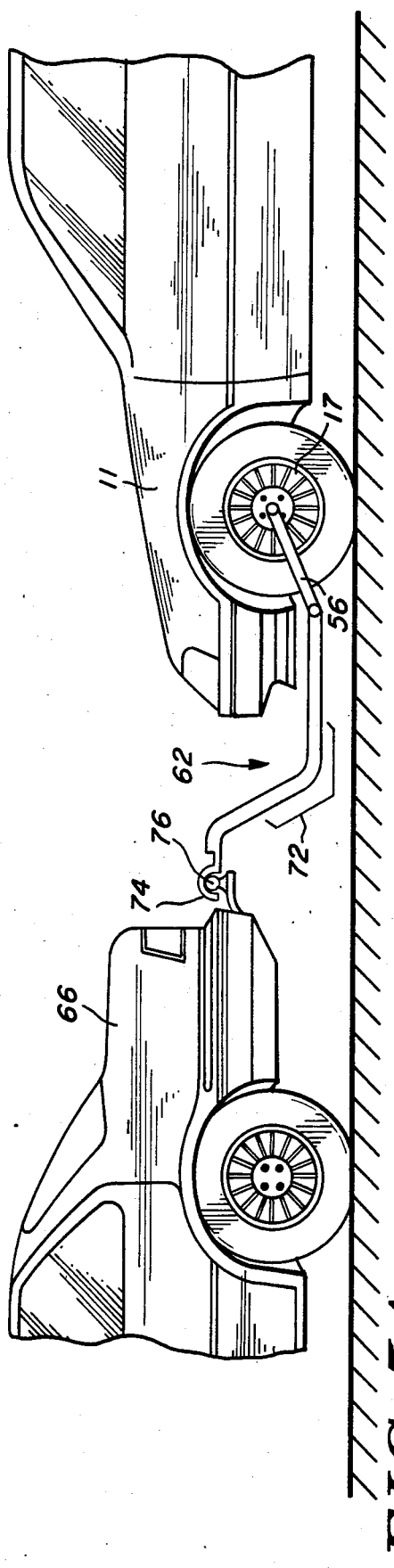
FIG. 5A and B illustrate a coupling frame and steer bar device joining a towed vehicle to a towing vehicle.
Figure 5B:
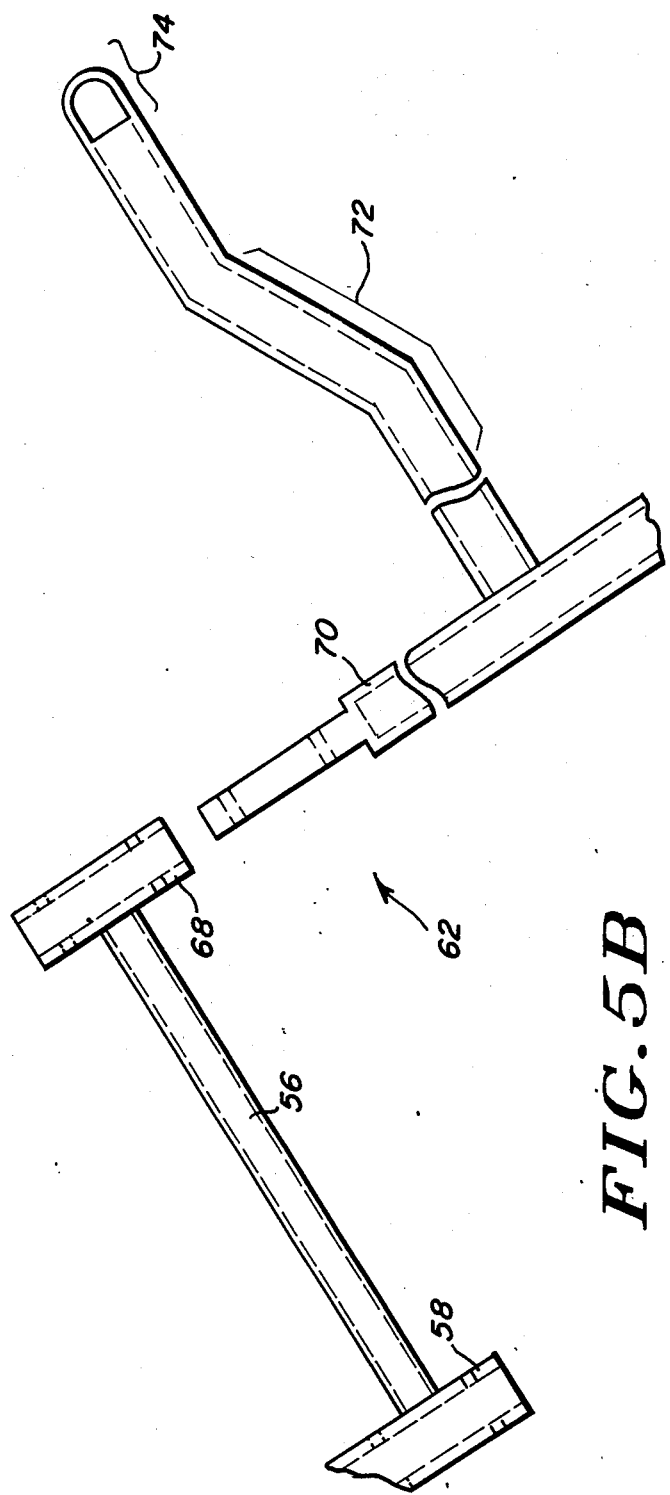

The side bar 56 is also part of a coupling frame 62 shown in FIG. 5, joining the towed vehicle 11 to a towing vehicle 66. The coupling frame 62 further includes a front T-section 68, a crossbar 70, an S-bar 72 and a coupling 74 attachable to a hitch 76 of the towing vehicle 66.

In another embodiment shown in FIG. 6, the steer bar device 52 is mounted without the tow bearing device 10 and is thus independently useful from the tow bearing device 10. The steer bar device 52 of FIG. 6 also has a rotating steering arm 78 driven by a turning wheel hub 80. The steer bar device 52 also includes ball bearings 82, which enable relative rotation of the side bar 56 about the steering arm 78, and a sleeve 86 coupled thereto by bolts 87, or other such fasteners, threadedly inserted through passageways 88. As can be seen in FIG. 6, the rotating steering arm 78 is attached to the wheel hub 80 using the lug nuts 26. The sleeve 80 is slipped over the free end of the steering arm 78 and then attached to the rotating steering arm 78 by the bolts 80.

Figure 4:
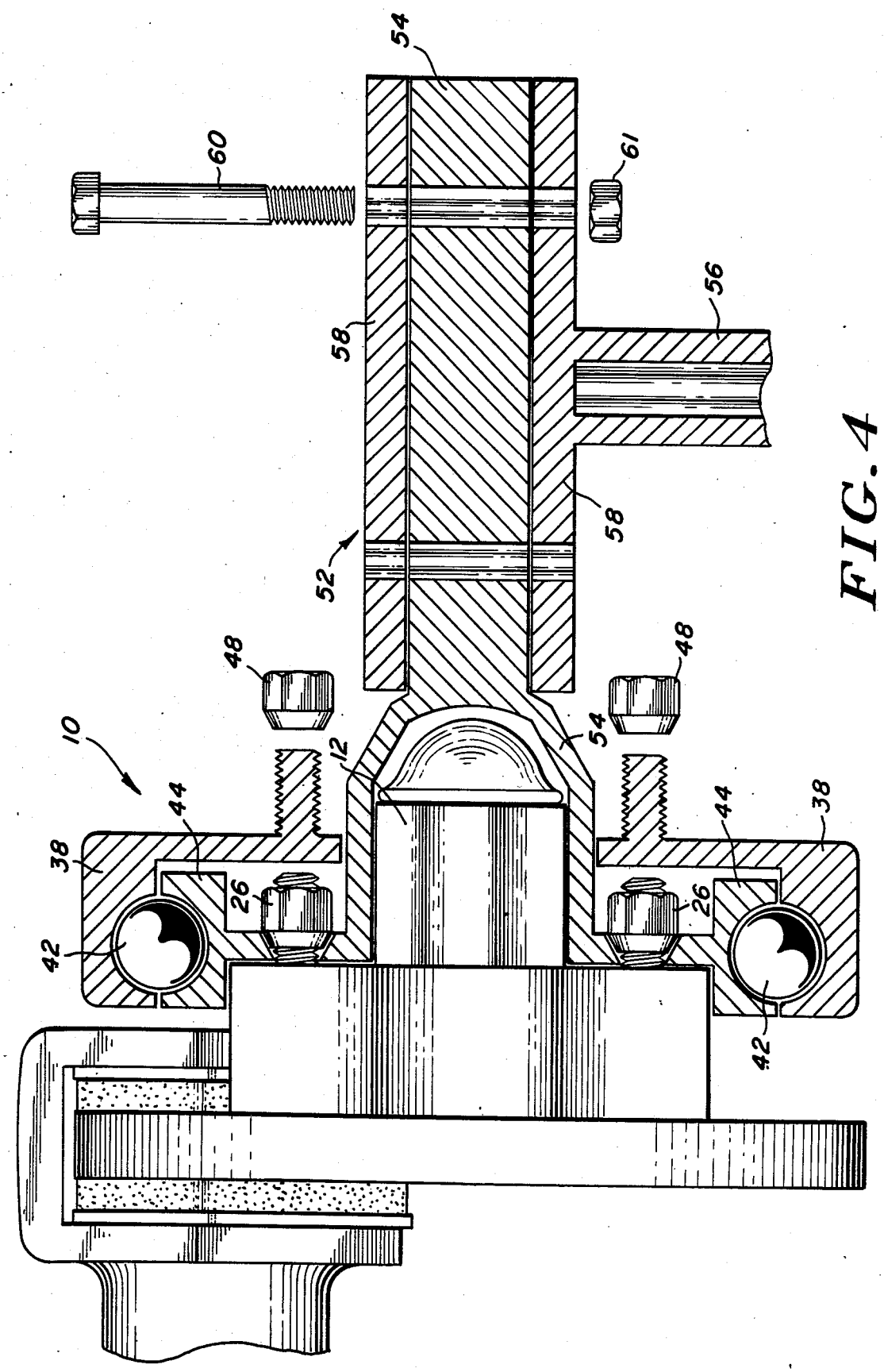
FIG. 4 is a steer bar device coupled to the tow bearing device shown in FIG. 2.

Referring to FIGS. 4-6, assembly and connection of the coupling frame 62 between the steer bar device 52 and the hitch 76 of the towing vehicle 66 is accomplished differently for the two different embodiments illustrated in FIGS. 4 and 6. For the steer bar device 52 of FIG. 4, the wheel/tire 17 (see FIG. 5) is first removed from the wheel hub 12. The tow bearing device 10 and the fixed steering arm 54 are attached to the wheel hub 12 with the lug nuts 26. The wheel/tire 17 is bolted to the outer bearing assembly 38 with the lug nuts 48. The side bar 56 terminates in the sleeve portion 58 which is slid over the fixed steering arm 54 and the bolts 60 and the nuts 61 coupled to form the sleeve portion 58 to the fixed steering arm 54. In the case of the steer bar device 52 of FIG. 6, the side bar 84 is more readily attached to the rotating steering arm 78 by clamping the sleeve 86 directly thereon using the bolts 87.

In another form of the invention the tow bearing device 10 is coupled permanently to the wheel/tire 17 as is frequently done in the permanent mounting of snow tires to a wheel for seasonal use. This configuration would be quite useful for the frequent user of the tow bearing device 10.

While preferred embodiments of the present invention have been illustrated and described, it will be understood that changes and modifications may be made therein without departing from the invention in its broader aspects. Various features of the invention are defined in the following claims.

What is claimed is:

1. A steer bar device attachable to a vehicle for towing of said vehicle and for enhancing steering action response in the steering system of said vehicle, comprising:

means for coupling a towing vehicle to said steer bar device; and frame means for connecting selected wheel hubs of said vehicle to said coupling means, said frame means transmitting steering action from said towing vehicle to said selected wheel hubs and in turn to the steering system of said vehicle.

2. The device in claim 1 wherein said frame means comprises a steering arm connected to said selected wheel hubs.

3. A towing system for a vehicle including a coupling frame extending from the vehicle, comprising:

means for connecting a towing vehicle to said coupling frame;

means for rotatably mounting a selected wheel/tire of said vehicle, said mounting means coupled to said connecting means; and inner means for isolating selected vehicle wheel drive hubs associated with said selected wheel/tire from rotation of said mounting means, said inner isolating means including bearing means for rotatably supporting said mounting means.

4. The device as defined in claim 3 wherein said connecting means comprises a steering arm.

5. The device as defined in claim 4 wherein said connecting means is attachable to said vehicle wheel hubs using the lug nut studs and lug nuts of said vehicle.

6. The device as defined in claim 4 wherein said frame means comprises a sleeve for rotatingly receiving said steering arm.

7. A towing system for a vehicle including a coupling frame extending from the vehicle, comprising:

means for connecting a towing vehicle to said coupling frame, said coupling frame joined to means for steerably connecting selected wheel hubs of said vehicle to said coupling frame;

means for rotatably mounting a selected wheel/tire of said vehicle; and inner means for isolating selected vehicle wheel drive hubs associated with said selected wheel/tire from rotation of said mounting means, said inner isolating means including an outer bearing assembly means for rotatably supporting said mounting means.

8. The towing system as defined in claim 7 wherein said means for steerably connecting comprises a steer bar device.

9. A method for a towing vehicle to tow a vehicle on vehicle tires mounted on wheels connected to selected wheel hubs in turn coupled to the automatic transmission of said vehicle, comprising:

removing said mounted wheels from said wheel hubs;
mounting on said wheel hubs means for isolating said wheels from rotation of said wheel hubs;
coupling a steer bar to said isolating means;
remounting said wheels on said isolating means;
attaching one end of a tow bar to said vehicle;
attaching the other end of said tow bar to said towing vehicle; and
towing said vehicle on at least said vehicle tires associated with said wheel hubs connected to the automatic transmission, said towing not causing rotation of said associated wheel hubs.

10. A tow bearing device attachable to a vehicle enabling a towing vehicle to tow said vehicle on a wheel and tire associated with said tow bearing device without rotating a vehicle wheel hub coupled to said associated wheel and tire, comprising:

an inner bearing assembly in communication with said wheel and tire and mechanically coupled to said associated vehicle wheel hub;
a steer bar device coupled to said inner bearing assembly, said steer bar device adapted to steeringly join said vehicle to said towing vehicle;
an outer bearing assembly for mounting said wheel and tire about the circumferential perimeter thereof; and
means for isolating the rotation of said outer assembly from said inner bearing assembly while still utilizing the suspension/steering system of said vehicle during towing by said towing vehicle using said steer bar device.

* * * * *